United States Patent Office 3,328,337
Patented June 27, 1967

3,328,337
PREPARATION OF SPINNING SOLUTIONS OF POLYPROPYLENE
Leonard O. Frescoln, Wilmington, Del., assignor to Hercules Incorporated a corporation of Delaware
No Drawing. Filed Oct. 14, 1963, Ser. No. 316,155
1 Claim. (Cl. 260—34.2)

This invention relates to the preparation of a solution of stereoregular polypropylene for the extrusion of shaped structures. In particular, the invention is directed to the preparation of a spinning solution which is substantially free of air, water, and other materials which form gases under spinning conditions and which can be spun into filaments without difficulty.

There has been proposed a method for solution spinning of polypropylene wherein a dispersion of the polymer in the diluent in which the polymer is formed is heated to dissolve the polymer and the solution directly extruded into filament without separation of the polymer from the diluent in which it is prepared until after extrusion. Such a process offers many advantages and economies over conventional solution spinning techniques. However, one problem encountered in the process concerns the presence in the spinning solution of bubbles of air, small amounts of water, and the presence of other gaseous and vaporforming constituents which cause defective and inferior quality filaments as well as filament breakage and other difficulties during spinning.

Attempts to degas the spinning solution by allowing the solution to stand in vessels at ambient or reduced pressure for a sufficient length of time for the bubbles to rise and disengage themselves from the solution, or by vacuum distillation methods known to be effective for degassing solutions of other polymers have not proved practical for solutions of polypropylene. One of the reasons for this is that the polypropylene solution is highly viscous, thereby requiring lengthy residence times to degas the solution. For example, a typical solution of polypropylene having a viscosity up to about 150,000 centipoises contained in a tank to a liquid depth of 18″ would require about 16 hours to degas adequately. With such a method, tankage investment costs are high, and a large inventory of polymer solution is required. This is particularly disadvantageous if a number of various types of solutions are to be employed for different types of fibers. The long degassing time at elevated temperature also limits the types of fiber additives which can be used. For example, additives such as antioxidants and ultraviolet light stabilizers which would improve the fiber properties under normal use conditions, but which would be too unstable thermally to stand the long degassing times at elevated temperature, could not be employed.

While the use of vacuum reduces the time for degasification, the increased cost to provide vacuum tanks partially counterbalances any savings on tankage requirements. The degasification of viscous solutions of polypropylene under vacuum involves a cumbersome and prolonged treatment at reduced pressures and elevated temperatures and results in considerable thermal degradation of some of the components in the solution. Additionally, vacuum degasification of polypropylene solutions must be carried out at relatively high temperatures with common solvents in order to maintain the polypropylene in solution and to reduce the viscosity of the solution.

The use of various gas-disengaging aids such as a thin layer or film of the solution to which heat and/or vacuum may be applied, mechanical scrapers, and mechanical assistants for coalescing bubbles have not offered sufficient economic advantage to make the degasification of solutions of polypropylene commercially feasible.

Attempts to remove air, water, and other gaseous and vapor-forming constituents by the application of vacuum to polymeric dispersions of polypropylene prior to dissolution offer the advantages of working with distillation mediums having much lower viscosities than the corresponding solutions. However, subsequent conversion of the deaerated and dehydrated dispersion into a spinnable solution by heating the dispersion with agitation in a conventional mixer-dissolver under conditions which minimize polymer degradation results in the reintroduction of gases and thus produces a spinning solution which is no better than one which has not been previously deaerated.

Now, in accordance with the present invention, it has been discovered that degassed and dehydrated solutions of stereoregular polypropylene suitable for spinning into filaments can be produced economically by the combined steps of (1) applying vacuum to a dispersion of stereoregular polypropylene in a diluent which is essentially a nonsolvent for the polymer at a temperature below about 90° C. and which is a solvent for the polymer to the polymer to the extent of at least 15% at a temperature of 130° C. and above while holding the dispersion at a temperature below about 90° C. until substantially all dissolved gas and water present in the dispersion are removed, (2) transferring the degassed and dehydrated dispersion to a closed vessel, (3) substantially completely filling the closed vessel with the dispersion, and then (4) heating the dispersion therein to a temperature of at least about 130° C. until substantially all of the polymer is dissolved.

Thus, the process is characterized by degasification and dehydration of the polymeric dispersion while the viscosity of the liquid phase of the dispersion is low, and then dissolution of the polymer under conditions which prevent reintroduction of gas or vapor prior to the actual spinning operation. Hence, vapor and gas bubbles can be removed from the polymeric dispersion more rapidly and at lower cost than from the more viscous solution of the polymer. The process not only simplifies and hence economizes solvent spinning techniques, but also makes it possible to realize other advantages. One of these is that little or no diluent is lost during the process and practically all of the diluent can be recovered in an essentially pure state or with a minimum of repurification. Another advantage is that the degasification and dehydration can be carried out simply at low temperatures in a very short period of time thereby minimizing the possibilities of diluent and polymer degradation. This reduction of the residence time of the dispersion at elevated temperatures and the minimization of thermal degradation problems permits the use of additives such as certain antioxidants and ultraviolet light stabilizers which ordinarily would not possess sufficient thermal stability for use with long degassing periods at elevated temperature. Still another advantage is that antioxidants and stabilizers can be blended into the low viscosity dispersion continuously or batchwise just before the dissolution of the polymer. Consequently, inventory of dispersions and solutions containing specific additives is minimized, the problems associated with change-over to different additives is minimized, and the additives are incorporated much more easily and hence at lower cost than when incorporated into the higher viscosity solutions. Still another advantage is that the process is suitable to both batch and continuous operation without costly hold-up times or equipment layout. Still another advantage is that removal of water and gases at an early stage of the process minimizes the possibility of equipment corrosion due to contaminants originally present or formed during the process and permits in-process storage of essentially virgin dispersions. Contamination of the spinning solution by corrosion products is also minimized and equipment costs reduced.

Other advantages will be apparent from the illustration of the process by the following examples in which all parts and percentages are by weight unless otherwise specified.

*Example 1*

A polymerization vessel was charged with 10,000 parts of a mixture of saturated aliphatic hydrocarbons having a boiling point range of 170° to 200° C. and flushed with nitrogen. Next there was added to the vessel 110 parts of a 1.82 M solution of diethylaluminum chloride in the above hydrocarbon mixture and 54 parts of a 1.84 M suspension of titanium trichloride (prepared by reducing titanium tetrachloride with aluminum) in the same diluent. The vessel was evacuated and charged to 15 p.s.i.g. with propylene. Polymerization was initiated upon the introduction of propylene (containing a small amount of hydrogen as molecular weight regulator) and was continued for 6.5 hours at 50° C. while maintaining a propylene pressure of 15 p.s.i.g.

At the end of the polymerization cycle there was present in the vessel a dispersion of stereoregular polypropylene (in the form of fine particles ranging from about 5 to 385 microns in size) in the polymerization diluent the, polypropylene constituting about 26% of the total dispersion. Polymer isolated from a sample of the dispersion by evaporation of the diluent at reduced pressure had a reduced specific viscosity (determined on a solution of 0.1 g. of polymer in 100 ml. of decahydronaphthalene at 135° C.) of 4.9 and contained about 2% of polymer soluble in n-heptane at 21° C.

To the dispersion there was added 300 parts of n-butanol under an atmosphere of nitrogen and the butanol-treated dispersion agitated for 1 hour at 60° C. Next there was added to the dispersion 4000 parts of 4% aqueous sodium hydroxide and the mixture agitated for 60 minutes, this resulting in a transference of catalyst residues into the aqueous phase of the mixture in the form of fine particles. After settling, the hydrocarbon phase containing the polymer, and the aqueous phase, containing the butanol and catalyst residues, were separated by decantation. The hydrocarbon phase, comprising a dispersion of the polymer, was washed by passing the dispersion upwardly through a Mixco extractor countercurrent to a downward flow of water. The concentration of polymer in the washed hydrocarbon phase was then adjusted to 28% by adding or removing diluent from the dispersion and the dispersion, containing 1–3% water and dissolved air, charged to an agitated dehydrator equipped with a vacuum pump, a water-cooled condenser, and a water-solvent separator designed to continuously reflux diluent back to the dehydrator and to flow water to a separate receiver. The dispersion was vacuum distilled at 60–70° C. and 10–15 mm. Hg vacuum until no water was visible in the distillate (about 1 hour after the overhead temperature had risen from 40° to 60° C.). There resulted a polymer dispersion which was degassed and contained less than 300 p.p.m. water. The dispersion was then pumped continuously to a scraped-wall heat exchanger in an amount sufficient to maintain the exchanger completely filled at all times and the dispersion heated in the exchanger to 185–190° C. to dissolve the polymer. Polymer solution was metered from the exchanger through a filtration unit to the spinneret at a rate of 90–100 ml./min. and a temperature of about 180–182° C. and the solution extruded downwardly through a spinneret having 66 holes of 0.012″ capillary diameter and 0.050″ length and hole spacings of 0.15″ at a take-up speed of 283 meters per minute. The solvent-laden filaments emerged from the spinneret into a drying chamber about 3.25 inches inside diameter and 25 feet long, and having a wall temperature of 120° C. Steam carrier gas at a temperature of 130° C. was introduced into the bottom of the chamber at a rate of about 30 lbs. per hour and was exhausted from the top of the chamber. Solvent was evaporated from the filaments by the drying action of the heated carrier gas. The filaments emerging from the drying chamber were passed over rolls rotating at a peripheral speed of about 1200 feet per minute, collected in a single yarn, and wound on a bobbin. The yarn was then stretched over differential rolls at a temperature of 140° C. at a stretch ratio of 8:1 to yield a yarn having the following properties:

Denier per filament _____ 2.3–2.5  
Tenacity _____g. per denier__ 6.5–6.9  
Elongation at break _____percent__ 25–28

For the sake of comparison, the procedure of Example 1 was repeated except that the polymeric dispersion from which the catalyst residues had been solubilized and removed was heated at 160° C. in an agitated vessel for several hours to dissolve the polymer and insure complete solution. The solution was then pumped through a filter to a hold tank and degassed and dehydrated by maintaining the solution at about 160° C. until the gas and water vapor bubbles within the solution had escaped. Sixteen hours were required to remove the bubbles and provide a solution suitable for spinning.

*Example 2*

The procedure of Example 1 was repeated with the exception that the diluent was a mixture of saturated aliphatic hydrocarbons having a boiling point range of 150–175° C. which gave at the end of the polymerization a dispersion wherein polypropylene having an RSV of 3.5 constituted about 35% of the total dispersion. After dehydration, the polymer dispersion containing 300 p.p.m. water was pumped to the scraped-wall heat exchanger in an amount to fill the exchanger completely and the polymer dispersion heated at about 175° C. to produce the spinning solution. The solution was spun into filaments without difficulty or breaks, giving fibers of good uniformity.

*Example 3*

The procedure of Example 2 was repeated with the exception that the dispersion, without being degassed and dehydrated, was pumped directly to the scraped-wall exchanger and heated at about 175° C. to dissolve the polymer. The dispersion, prior to solution, contained 0.28% water and some dissolved gases. Attempts to spin the solution into filaments were not successful due to filament breakage. What little filament that was produced had low denier (1.1–1.2) and was nonuniform in cross-section.

The invention requires the employment of an inert liquid organic diluent which is essentially a nonsolvent or a very poor solvent for polypropylene up to a temperature slightly higher than that temperature at which the vapor pressure of the diluent is sufficiently high to permit complete dehydration and degassing without evaporation of an appreciable amount of diluent. Additionally, the diluent should be a good polymerization diluent, should be essentially insoluble in water, and should be a solvent for polypropylene at a temperature not higher than the initial distillation point of the diluent. Preferably, the diluent should have a specific gravity less than 0.9 at 20° C. and should be a solvent for stereoregular polypropylene to an extent of at least about 15% by weight at an elevated temperature of 130° C. and above but essentially a nonsolvent for the same polymer at temperature below about 90° C. Also, the diluent will be one which preferably has an initial boiling point of 160° C. to 170° C., and a boiling range as narrow as practicable. Diluents having a boiling range of about 170° C. to 200° C. have been employed with success. Numerous diluents meet the necessary qualifications. Exemplary are saturated aliphatic hydrocarbons such as n-decane; mixtures consisting primarily of n-decane and n-undecane; or mixtures consisting primarily of n-nonane, n-decane, and n-undecane. Other useful diluent components include paraffin isomers or naphthenes which are within the preferred boiling point range, and are solvents for polypropylene to the extent of at least 15% at temperatures above about 130° C., aromatic hydrocarbons such as p-cymene, and the like.

The individual steps of the invention can each be carried out by methods known to the art, and the choice of specific conditions for the performance of each step within the requirements of the invention is well within the ability of those skilled in the art. For example, the dehydration and degassing is preferably carried out using a polymeric dispersion comprising, by weight of the dispersion, 15 to 60% solid polymer having an RSV ranging from 2.5 to 5.0 and a particle size of about 5 to 385 microns in diameter. In some cases, however, it may be desired to increase or decrease the solids content of the dispersion and to increase or decrease the size of the polymer particles in the slurry. The length of time required to degas and dehydrate the dispersion likewise will vary within relatively wide limits depending upon the viscosity of the dispersion, the size and porosity of the polymeric particles, and the amount of air, other gases, substances which form gases under spinning conditions, and water originally present therein. Usually a period of about 2 to 5 hours will be sufficient to remove all the dissolved gas and to reduce the water content of the slurry to a negligible amount, e.g., below 0.08% by weight, and preferably below 0.03%.

The application of vacuum to the polymer dispersion can be carried out using techniques known to the art. A preferred form of construction for use in degassing and dehydrating the dispersion in accordance with the invention comprises a vacuum distillation unit having a solvent-water separation unit. However, other apparatus in the form of a batch or continuous vacuum evaporator are also suitable.

The dissolution of the polymer in a closed vessel completely filled with a dispersion of the polymer in a diluent which is a solvent at elevated temperature likewise may be carried out in heating and dissolving apparatus known to the art. Particularly suited for the purpose of the invention is a scraped-wall heat exchanger or vessel having internal agitator blades or screws which scrape or pass close to the internal heat transfer surface of the heat exchanger or vessel. Also suitable are tubular heat exchangers, vessels having internally heated agitators, and the like.

The invention has been particularly described with reference to the production of degassed solutions of stereoregular polypropylene for use in the spinning of filaments and fibers. It is obvious, however, that the degassed polymer solutions can also be used for the extrusion of other shaped structures, such as film.

What I claim and desire to protect by Letters Patent is:

A process for producing a degassed solution of stereoregular polypropylene for extrusion of shaped structures comprising applying vacuum to a dispersion of the polymer in an essentially water-insoluble hydrocarbon diluent which is a good polymerization diluent, which is a solvent for the polymer at a temperature not higher than the initial distillation point of the diluent, which is essentially a nonsolvent for the polymer at a temperature below about 90° C. and which is a solvent for the polymer to the extent of at least 15% at a temperature of 130° C. and above while holding the dispersion at a temperature below 90° C. until substantially all dissolved gas and water present in the dispersion are removed, transferring the deaerated and dehydrated dispersion to a closed vessel, substantially completely filling said closed vessel with said dispersion, and then heating said dispersion therein to a temperature of at least about 130° C. until substantially all of the polymer is dissolved.

References Cited
UNITED STATES PATENTS 3,072,626    1/1963    Cines _____ 260—94.9
3,084,149    4/1963    Stevens et al. _____ 260—94.9

MORRIS LIEBMAN, *Primary Examiner.*

A. LIEBERMAN, F. M. SIKORA, *Assistant Examiners.*